United States Patent
Liu et al.

(10) Patent No.: US 11,734,291 B2
(45) Date of Patent: Aug. 22, 2023

(54) PARALLEL EXECUTION OF API CALLS USING LOCAL MEMORY OF DISTRIBUTED COMPUTING DEVICES

(71) Applicant: eBay Inc., San Jose, CA (US)

(72) Inventors: Yi Liu, Shanghai (CN); Qingyu Ji, Shanghai (CN); Bin Li, Shanghai (CN); Sizhong Liu, Shanghai (CN); Haowen Zhu, Shanghai (CN); Peijun Xu, Shanghai (CN); Chinmaya Dubey, Seattle, WA (US)

(73) Assignee: eBay Inc., San Jose, CA (US)

( * ) Notice: Subject to any disclaimer, the term of this patent is extended or adjusted under 35 U.S.C. 154(b) by 8 days.

(21) Appl. No.: 17/076,267

(22) Filed: Oct. 21, 2020

(65) Prior Publication Data

US 2022/0121662 A1 Apr. 21, 2022

(51) Int. Cl.
*G06F 16/00* (2019.01)
*G06F 16/2458* (2019.01)
*G06F 16/248* (2019.01)
*G06F 16/2455* (2019.01)

(52) U.S. Cl.
CPC ........ *G06F 16/2471* (2019.01); *G06F 16/248* (2019.01); *G06F 16/2455* (2019.01)

(58) Field of Classification Search
CPC . G06F 16/2471; G06F 16/2455; G06F 16/248
USPC ................................. 707/600–899
See application file for complete search history.

(56) References Cited

U.S. PATENT DOCUMENTS

| | | | |
|---|---|---|---|
| 8,996,456 B2 | 3/2015 | Naidu et al. | |
| 9,613,120 B1* | 4/2017 | Kharatishvili | G06F 16/23 |
| 9,686,086 B1* | 6/2017 | Nguyen | H04L 67/141 |
| 2009/0077011 A1* | 3/2009 | Natarajan | G06F 16/24532 |
| 2009/0132541 A1* | 5/2009 | Barsness | G06F 16/24532 |

(Continued)

OTHER PUBLICATIONS

Performance Tuning, Retrieved from the Internet URL: <https://spark.apache.org/docs/latest/sql-performance-tuning.html#caching-data-in-memory>, Accessed on Oct. 26, 2020, 3 pages.

(Continued)

*Primary Examiner* — Michelle N Owyang
(74) *Attorney, Agent, or Firm* — Shook, Hardy & Bacon L.L.P.

(57) ABSTRACT

Methods, systems, and computer storage media are provided for providing an application programming interface ("API") for executing a query are provided. The API call, scheduling, and assignment processing engines may generate and schedule assignments, along with associated dataset portions, based on the query. Based on the assignments and datasets, the assignments may be scheduled for execution by processes of nodes in a distributed system. The API call and query may also include implementation instructions that require storing dataset portions into memory that is associated with a process executing the assignment for an in-memory database implementation. As the assignment is executed using a dataset portion that is stored on memory associated with a process, results may be stored in a file. Once each assignment has been executed and has a result file, the result files are merged to provide results of the query and API call to the user.

13 Claims, 5 Drawing Sheets

(56) References Cited

U.S. PATENT DOCUMENTS

| | | | |
|---|---|---|---|
| 2015/0113540 A1* | 4/2015 | Rabinovici | G06F 9/5011 |
| | | | 718/104 |
| 2018/0268000 A1* | 9/2018 | McManus | G06F 16/2471 |
| 2018/0293237 A1* | 10/2018 | Vandiver | G06F 16/284 |
| 2019/0102412 A1* | 4/2019 | Macnicol | G06F 16/248 |
| 2020/0073987 A1 | 3/2020 | Perumala et al. | |
| 2020/0151154 A1* | 5/2020 | Kumar | G06F 16/211 |
| 2020/0192703 A1* | 6/2020 | Kambatla | G06F 9/5077 |
| 2021/0089530 A1* | 3/2021 | Anand | G06F 16/24552 |
| 2021/0191931 A1* | 6/2021 | Kogan | G06F 16/2455 |

OTHER PUBLICATIONS

Wikipedia,"In-memory database", Retrieved from the Internet URL:<https://en.wikipedia.org/wiki/In-memory_database>, Accessed on Oct. 26, 2020, 4 pages.

* cited by examiner

PARALLEL EXECUTION OF API CALLS USING LOCAL MEMORY OF DISTRIBUTED COMPUTING DEVICES

BACKGROUND

Conventional application programming interface ("API") systems parse API calls into jobs and smaller tasks, each of which are executed one after another on computing devices. The tasks are often memory-intensive and require many input/output calls to disk memory or network resources in order to load data needed to perform the tasks. Often times, one task must be performed before another task may be performed and the execution of one task depends on another. In conventional systems, such as Apache Spark (https://spark.apache.org/), any time a task needs to be performed, the computing device must load all relevant data from disk memory onto the computing device performing the task using time-consuming input/output calls. Once a task is completed, the results may be sent to another computing device in the system in order to perform another task, which again starts a series of input/output calls to transmit results and load another set of data from disk memory onto another computing device. These issues are only compounded when a high volume of API calls, which are parsed into numerous queries and tasks, are received. This inefficient way of processing tasks of an API call adds to the time it takes to complete a task, creates bottlenecks within the system due to time-consuming input/output calls, exhausts virtual resources, and strains the system's ability to execute a high volume of tasks corresponding to an API call.

SUMMARY

At a high level, aspects described herein relate to executing an application programming interface call ("API") using the local memory of distributed computing devices in a parallel manner. By loading relevant dataset portions into the local memory of distributed computing devices, the assignments or tasks associated with an API call can be executed in parallel.

When an API call is received, the API call is parsed into a query, which may be further parsed into assignments. Implementation instructions for the assignments may also be parsed from the API call and associated with the assignments.

With the query parsed from the API call, any relevant datasets necessary to execute the query may be determined. The datasets may be apportioned into smaller sets of data, which may be used by processes on a network of distributed computing devices to execute assignments or sub-assignments. In some aspects, dataset portions are generated while formulating a query plan or physical plan, which details what data is needed to execute assignments and where the data is located, among other things. Dataset portions may also be determined based on the number of assignments using the dataset portion. For instance, if several assignments utilize the same set of data, that data may be designated as a dataset portion for use by those assignments on a particular computing device. In some aspects, the dataset portions are created by splitting a large dataset equally among a set number of processes required for processing the query and associated assignments.

Assignments, which correspond to the query, are also generated and scheduled. Each assignment may also be parsed into sub-assignments. In some aspects, assignments are generated while formulating a query plan or physical plan, which details how many processes are needed to perform the assignments and what data is needed to execute each assignment, among other things. While formulating the query plan, the assignments may be generated based on the sub-assignments, or tasks, that are necessary to complete the query. For example, a query may be parsed into a series of "join" calls, with each "join" call considered to be an assignment or sub-assignment that a process on a computing device or node can execute. Each assignment or sub-assignment may also be associated with a unique identifier to identify the results that are associated with the assignment. The assignments, once generated, may be scheduled and grouped based on the dataset portions they use. For instance, if several assignments use the same dataset portion, the assignments may be grouped for execution by the same process of a node. The order that the assignments are performed using a process on a node may also be scheduled to ensure efficient use.

Once the assignments have been generated and scheduled, the assignments are sent to the nodes. In some aspects, a list of all assignments are sent to all of the nodes. Implementation instructions, which may require that dataset portions needed to execute assignments are loaded onto the memory associated with a process, may also be sent along with the assignments. In response to receiving such in-memory database implementation instructions, the process on a given node may load dataset portions associated with the assignments into memory associated with the process. For example, if a process on a node is tasked with performing a set of assignments, the corresponding dataset portion is loaded into the memory that is local to the process (e.g., connected to the process and can be accessed without the use of disk memory). For dataset portions that exceed the size of memory associated with a process, a lazy iteration method may be used to cycle through the dataset portion.

As each assignment is being executed, a temporary file may be created that includes any results that have been calculated prior to completion of the assignment. Once the assignment has been executed, the temporary extension will be removed, leaving a result file. Each assignment being performed on a node by a process may have its own result file. The filename of the result file, whether temporary or not, may have a naming convention that incorporates the assignment's unique identifier as well as an identifier of the dataset portion being used. The result files from each assignment may be stored in a folder hierarchy that also has folder names that incorporate identifiers associated with the dataset portions.

With each assignment executed and result files corresponding to each dataset portion collected, the result files may be merged to create one result file for the query. The result file for the query associated with an API call may be converted into a format that is more compatible with other components in the system. The results of the query, along with a notification as to whether the query was successfully implemented, may be transmitted to the user via a client-computing device.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

As described above, conventional API systems execute queries by performing tasks one-by-one in a distributed system. Often times, a query may result in the performance of many tasks. Compounded over several incoming API calls (and their corresponding queries) input around the same time, the number of tasks to execute dramatically increases. These tasks are performed, often in co-depending order, across a distributed network of computing systems. These systems, however, have particular shortcomings that stem from time-consuming input/output calls that are performed when each task of a query is executed in sequential order.

In one example, conventional API systems receive API calls and parse the API calls into queries, which are further parsed into tasks. In order to execute a particular task, the API systems facilitate an input/output call to the disk memory (or network resources) to retrieve and load relevant data for use by the computing device that is performing the task. After the task has been executed, the computing device once again makes another input/output call to transmit the results to other components in the system. To perform the next task on another computing device, the API system may again make another input/output call to retrieve and store data corresponding to the next task onto the computing device. Again, the result of that task is transmitted using an input/out call to the disk memory. Ultimately, this networked and distributed system creates particular challenges for API systems because each input/output call is time-consuming and slows down processing of each task for a query, especially when the execution of one task depends on the execution of another task. This problem is compounded when numerous API calls are received as each API call is associated with a high volume of tasks to execute.

The time-consuming nature of input/output calls and the serial execution of tasks on a distributed system makes it difficult for API engines to service a high number of API calls, queries, and tasks without significant bottlenecks with respect to resources. For instance, at the time of drafting this disclosure, API calls involving 20 million keywords with 100 processes with 50G memory per process took more than 30 hours to execute on an Apache Spark framework.

Due to the inherent delays in retrieving and storing data created by interconnected networks and computing devices, it is essential for the operation of these networks and the use of such computing devices that the number of input/output calls to disk memory and/or network resources are reduced and optimized for a set of asks related to an API call. This is because it is time-prohibitive to process tasks in serial order with multiple input/output calls to disk memory and/or network resources. To put this in perspective, it would take more than one day to process a high volume of API calls with 20 million keywords on an Apache Spark framework.

To lessen this problem, API engines optimize the execution of queries and tasks. API engines seek to optimize the execution of tasks by using a distributed system of networked computing devices. In this way, the API engine can spread out the execution of tasks across multiple computing devices and easily route a task to another computing device if a particular computing device fails to complete a task.

Many times, however, conventional API engines fall short of this goal when dealing with a high volume of API calls and associated tasks. Consequently, this can lead to longer response times for all API calls. Conventional API engines that perform one task after the other, where each task performed on a different computing device or process, are particularly susceptible to this problem. Because execution of each task involves time-consuming input/output calls to obtain the relevant data to perform the task, a high volume of API calls leads to a substantial bottleneck in the time it takes to access and load data needed to execute a task. This can ultimately result in the stalling of API systems to service several API calls at once.

To lessen these problems, the technology described herein provides a dataset generator and an assignment generator that divide the dataset used by a query into portions that can be loaded into memory local to processes. The assignments associated with dataset portions can be grouped to be executed by the same process using its accompanying local memory. The dataset and assignment generators allow the assignments associated with a query to be performed in parallel and without the need of input/output calls for each and every task, especially when several tasks would load the same dataset portion into memory for execution.

In this way, multiple assignments associated with a query may be executed by the same process with local memory access to necessary information for all of the grouped assignments instead of executing each assignment using different processes on different nodes that retrieve necessary data using input/output calls for the execution of each task. Likewise, the query may be split into assignments that are performed by processes with access to relevant dataset portions, causing assignments that were previously performed one-by-one in serial succession to be performed in parallel across processes that each have local memory access. This dramatically reduces the number of input/output calls, resulting in a shorter response time for API calls, even when there is a high volume of API calls. In brief reference to the example provided above, API calls involving 20 million keywords would be completed within 20 minutes on an Apache Spark framework using the technology described herein.

One example method for achieving these advantages and improvements begins by receiving an API call at an API call engine. The API call may include in-memory database implementation instructions to take advantage of memory local to processes during execution. The API call engine routes the API call to be parsed into queries, which are then further parsed into assignments.

Once parsed, the relevant dataset for the query and/or assignments are determined. The datasets and assignments may be determined as a part of the API call engine formulating a query plan or physical plan. The dataset is divided into portions that may be loaded onto the memory local to a process on a computing device, as indicated by in-memory database implementation instructions provided in the API call. Assignments are determined from the query and scheduled based on the dataset portions. Assignments that use the same dataset portion may be grouped together for execution by the same process that is using local memory loaded with the corresponding dataset portion.

The process on a computing device may execute an assignment and provide results in a result file. Said another way, each assignment has a corresponding result file that contains some or all of the results associated with the assignment. While the process is executing a particular assignment, the process may provide incoming partial results in a temporary file. Once completed, the process may remove the temporary extension. The names of files and folders in a hierarchy of result files may incorporate the unique identifier of an assignment and/or indication of the dataset portion used to execute the assignment. Once the result files have been completed for each assignment, the results are merged. The results may be merged in a particular order based on how the assignments were executed. The merged result file may also be converted into a different file format for use by other components in the system.

Because the query is executed as a set of smaller assignments, optimized for scheduling and grouped based on dataset portion usage, across multiple computing devices using the memory local to a processes on the devices, the use of input/output calls is drastically reduced. Whereas conventional systems require at least two input/output calls for each and every task, the technology described herein uses only one input/output call to load a dataset portion and another input/output call to transmit results for a group of optimized assignments executed by the same process.

The method previously discussed is only one example that can be performed using the technology described herein. This and other examples will be realized using the technology provided by the drawings, which are referenced now to provide further detail.

Figure 1:
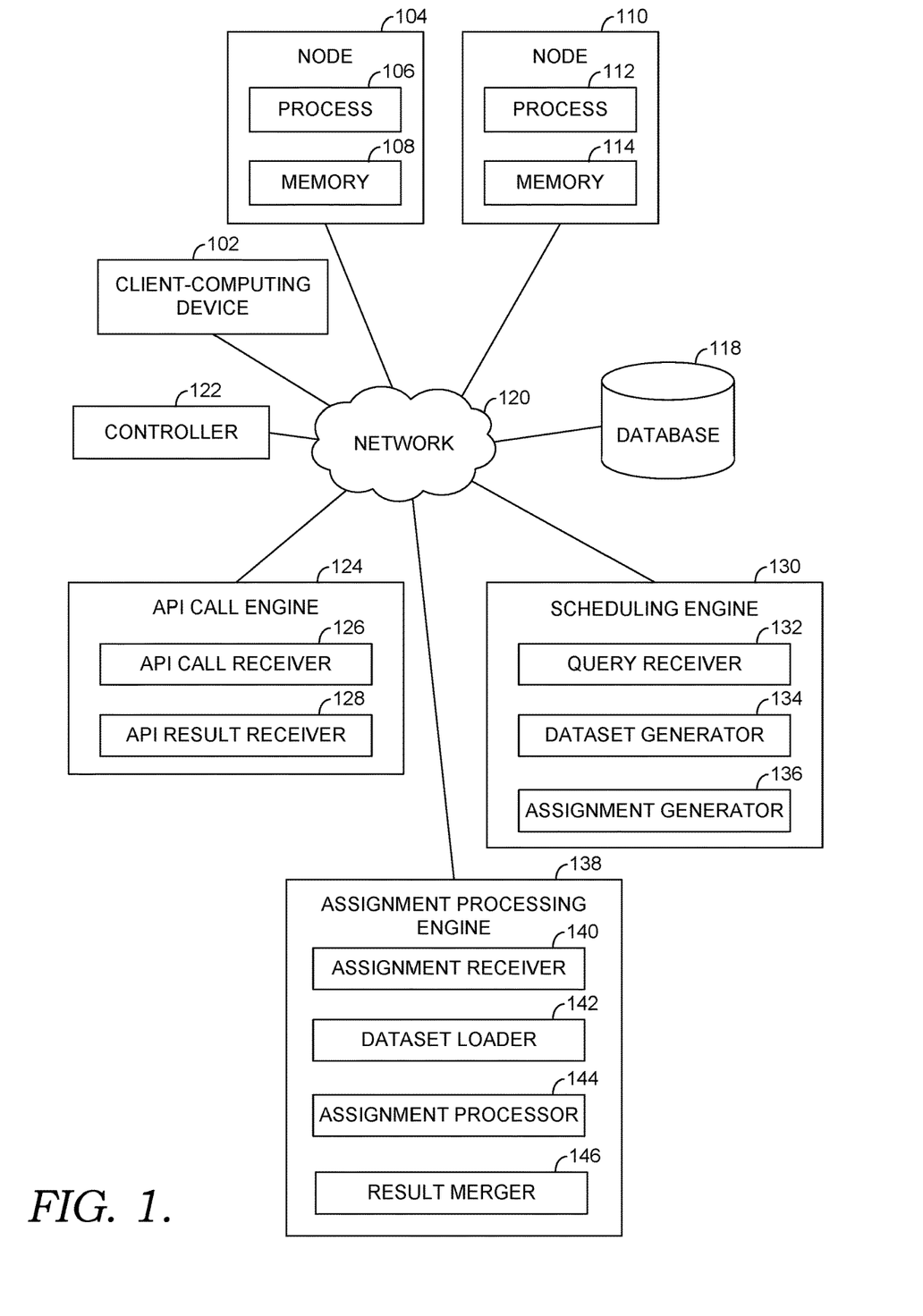
FIG. 1 is an example Application Program Interface ("API") call processing system in which implementations of the present disclosure may be employed.

Turning now to FIG. 1, FIG. 1 illustrates example API call processing system operating environment 100 in which implementations of the present disclosure may be employed. In particular, FIG. 1 illustrates a high-level architecture of API call processing system operating environment 100 having components in accordance with implementations of the present disclosure. The components and architecture of FIG. 1 are intended as examples, as noted toward the end of Detailed Description.

Among other components or engines not shown, API call processing system operating environment 100 includes client-computing device 102. Client-computing device 102 is shown communicating using network 120 to API call engine 124, scheduling engine 130, and assignment processing engine 138. Nodes 104 and 110 are also shown communicating using network 120 to controller 122, database 118, API call engine 124, scheduling engine 130, and assignment processing engine 138. The components of API call processing system operating environment 100 may communicate with each other over one or more networks (e.g., public network or virtual private network "VPN") as shown with network 120.

The components of API call processing system operating environment 100 can operate together to provide functionality for processing API calls to execute a query across multiple nodes by scheduling assignments and storing portions of a corresponding dataset in each node, examples of which will be further described. API call processing system operating environment 100 supports processing user input from client-computing device 102. In particular, client-computing device 102 can receive API calls, which includes requested API functionality, parameters to execute the API call, and implementation instructions, and communicate those forms of user input to scheduling engine 130 and assignment processing engine 138 through API call engine 124. Client-computing device 102 can also operate with API call engine 124, scheduling engine 130, and assignment processing engine 138 to cause the display of, all or a portion of, results of the user's API call. Nodes 104 and 110 can operate with controller 122, scheduling engine 130, and assignment processing engine 138 to process assignments associated with the user's API call and transmit the results. Controller 122 may operate with scheduling engine 130 and assignment processing engine 138 to manage and coordinate the assignment scheduling to facilitate processing of API calls in parallel across multiple nodes. API call engine 124 may receive user input and route the API call to scheduling engine 130. Scheduling engine 130 may receive the user's API call from API call engine 124, process the query in the API call, receive relevant datasets associated with the query from database 118, generate assignments, schedule the order of assignments, determine dataset portions, and transmit the assignments to nodes 104 and 110 for processing. Assignment processing engine 138 may receive the assignment for a particular node, load the assigned dataset portion onto nodes 104 and 110, execute the assignments, receive results from nodes 104 and 110, and merge the results from the nodes 104 and 110 to obtain a result for the query associated with the API call.

Network 120 may include, without limitation, one or more local area networks (LANs) wide area networks (WANs), or any other communication network or method. Client-computing device 102 may be a client computing device that corresponds to the computing device described herein with reference to FIG. 5.

Nodes 104 and 110 are generally computing devices that each include at least one process, such as process 106 and process 112, and accompanying memory, such as memory 108 and memory 114. Each node may include more than one process and accompanying memory. Nodes may be a physical computing device with components or a virtual machine simulating a single device that is implemented across several physical computing devices. Processes 106 and 112 execute assignments, as determined by the scheduling engine 130, using their respective memories, memory 108 and memory 114. Process 106 and process 112 may include one or more processors or cores that read and write data from various entities such as their respective memories, memory 108 and memory 114. In some aspects, process 106 is associated with memory 108, where memory 108 is considered to be "local" to process 106. Similarly, process 112 is associated with memory 114, where memory 114 is considered to be "local" to process 112. Said another way, the memories 108 and 114 associated with processes 106 and 112, respectively, may be accessed without use of an input-output call to disk memory. Nodes 104 and 110 may operate with controller 122, database 118, scheduling engine 130, and assignment processing engine 138 to receive assignments, process them, and transmit results.

Controller 122 generally coordinates assignments across multiple nodes 104 and 110. Controller 122 may be embodied as one or more devices that communicates with nodes 104 and 110 via network 120. Additionally, controller 122 may generate assignments, generate datasets and dataset portions, and communicate the assignments to the nodes, such as nodes 104 and 110, in operation with scheduling engine 130. Controller 122 may also receive the results of processed assignments from nodes 104 and 110 and merge the results in operation with assignment processing engine 138.

An API call may involve a request from the user to use a specific functionality from the API along with corresponding parameters to implement the API call. API calls may be received from a user via client-computing device 102. An API call includes (1) one or more queries, which are generally requests to perform a set of operations on a dataset, and (2) additional instructions regarding those queries. For instance, the API call may include a query, such as collecting various types of information located in different data stores regarding a registered user. In some aspects, the API call may include information on which datasets to use when implementing the queries and assignments. The API call may also include additional instructions regarding how to implement the query, such as whether to utilize the memory of nodes or to utilize disk memory through input/output calls. The input/output calls may be a transfer of data from one component to another component through the use of a network 120 or an electronic bus connecting system components.

An application program interface ("API") is an interface that allows user to make requests, or API calls, to perform certain functionality using another piece of software. For instance, an API call from a user may include a query to search for data. In this example, the API call is then translated into function calls parameters that another piece of software, such as database 118, will use to carry out the query.

Assignments are units of work necessary to process a query. Assignments may also be segmented into additional sub-assignments. For instance, following the earlier mentioned example, if the query is to collect and compile user information from multiple datasets, the query may be segmented into several assignments, where each assignment collects requested user data from a different data store and concatenates the collected information for transmission. Results from the performance of all assignments associated with a query may be merged to provide the result corresponding to a query associated with an API call.

Figure 5:
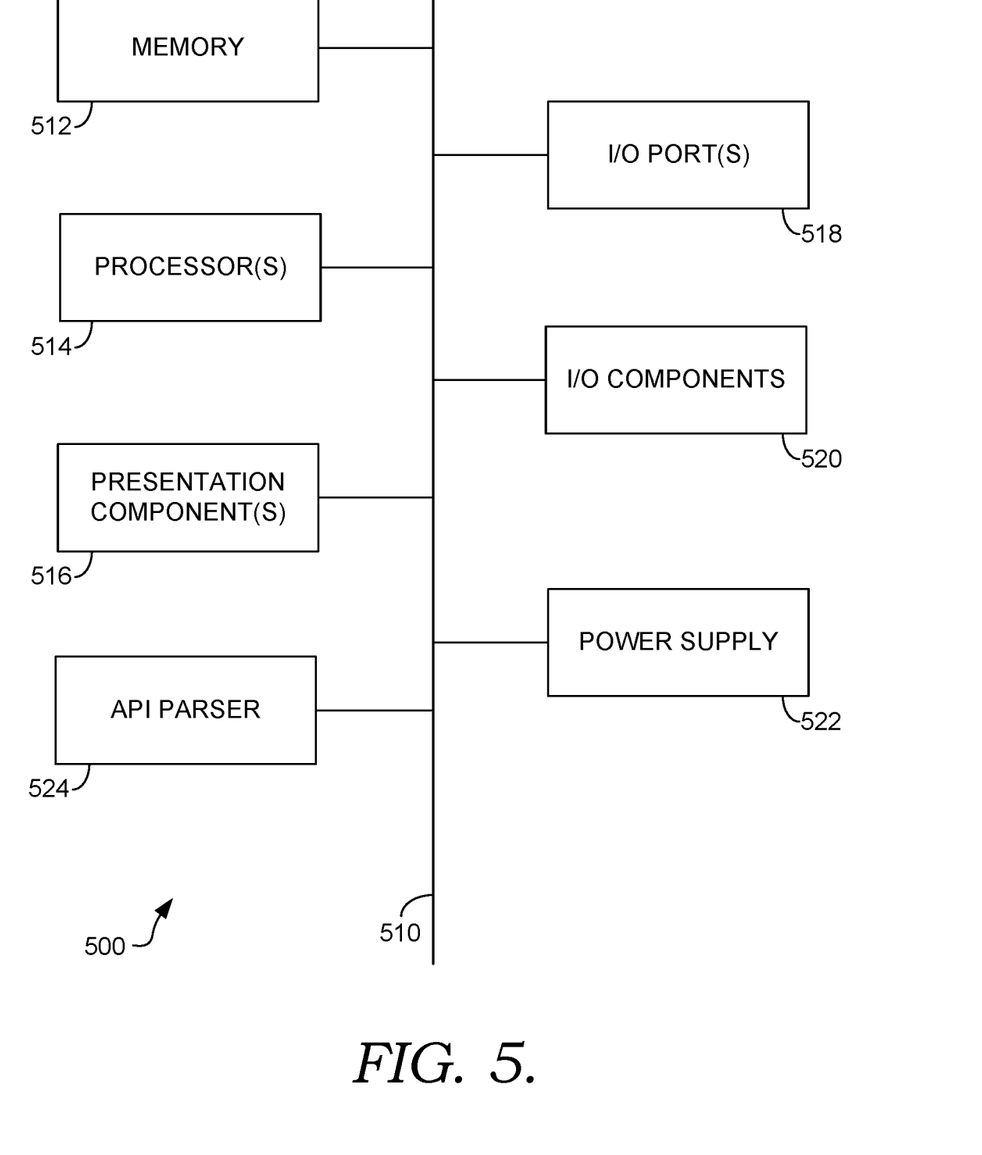
FIG. 5 is a block diagram of an example computing environment suitable for use in implementing aspects described herein.

Database 118 generally stores information including data, computer instructions (e.g., software program instructions, routines, or services), or models used in embodiments of the technical solutions. Although depicted as a database component, database 118 may be embodied as one or more data stores or may be in the cloud. Memory 512 of FIG. 5 is an example suitable for use as database 118. Database 118 stores, among other things, datasets relevant to incoming API calls, queries, and assignments.

A "user" may broadly include any identifiable origin of information. For example, a user may include a person using a computing device, such as client-computing device 102. A user may include client-computing device 102, itself. The term "caller" may also be used in reference to a user, especially with respect to a user submitting an API call with a query. In another example, a user may include the network over which client-computing device 102 communicates, such as one identified by an Internet Protocol (IP) address.

API call engine 124 is illustrated as including API call receiver 126 and API result receiver 128.

API call engine 124 may receive a request to perform an API call across multiple nodes, where each node has a process and associated memory to load portions of relevant datasets, from client-computing device 102.

To receive and process an API call, API call engine 124 may use API call receiver 126. API call receiver 126 generally receives API calls that have been received from a user through a user interface on client-computing device 102. API call receiver 126 may parse out the API call to determine the query and additional instructions in the API call. For instance, the API call receiver 126 may receive an API call to compile a set of data from multiple databases using in-memory functionalities of processes on distributed nodes. The received and parsed API call may be used by scheduling engine 130 to parse the query into assignments and provide additional instructions in the API call in the assignment to the nodes.

Once the API call has been performed and results have been calculated, API call engine 124 may use API result receiver 128. API result receiver 128 generally receives results from a performed API call. The results may be received from assignment processing engine 138, which merges the results received from nodes 104 and 110 that have processed assignments associated with the query. The API result receiver 128 may operate with the user interface of client-computing device 102 to present the results of the API call being performed to the client. In some aspects, the API result receiver receives a set of data resulting from the API call, which is provided to the user through the user interface of client-computing device 102. The API result receiver 128 may also receive a notification regarding whether the API call was performed successfully. In some aspects, the API result receiver may receive an error code describing why an API call was unable to be completed. In some aspects, the API results may be received from controller 122 in operation with assignment processing engine 138.

Scheduling engine 130 is illustrated as including query receiver 132, dataset generator 134, and assignment generator 136. Scheduling engine 130 may operate with API call engine 124 to receive API calls and transmit results and with assignment processing engine 138 to process assignments. Scheduling engine 130 may also operate with assignment processing engine 138 and controller 122 to communicate the assignments to nodes 104 and 110.

Query receiver 132 generally receives queries that have been parsed by API call engine 124 in response to an API call received from a user. Query receiver 132 may also receive additional instructions regarding the implementation of the queries, which are used to generate assignments. For example, a query to add data to various databases may be received with an additional instruction to implement the query by utilizing the memories 108 and 114 associated with processes 106 and 112. These instructions will be considered when generating and providing assignments to each of nodes 104 and 110.

Dataset generator 134 generally determines datasets that a particular query may use and apportions them for use by nodes 104 and 110. In some aspects, the dataset generator 134 may formulate a part or all of a query plan, or physical plan, which determines the location of necessary files and the order in which assignments will be executed, among other things. The query plan may include a physical plan of the data needed to perform the query. As a part of formulating the query plan, dataset generator 134 may also determine the locations of the datasets to determine whether multiple datasets exist across multiple data stores. In some aspects, the dataset generator 134 calculates the number of files and/or size of the datasets involved in processing the query in order to determine the hardware needs for a node to implement the query. The dataset generator 134 may also create a file listing that includes the location of all files needed to perform the query. For instance, if a query involves joining several rows of information in one database with another set of rows in another database, then the dataset generator may identify the database locations of each set of rows, compile those locations into a listing, and determine the total size of the rows needed to perform the query. In some aspects, the identification of the locations and estimated size of the dataset may be determined through the use of additional API calls. The dataset generator 134 may also perform this process with respect to assignments, or sub-assignments, instead of a query as a whole.

The dataset generator 134 may then split the dataset necessary to perform the query into portions. The dataset generator 134 may determine the size of each portion of the data set based on the memory capacity of memories 108 and 114 on nodes 104 and 110. In some aspects, the dataset generator 134 may split the dataset into equal-sized portions. In other aspects, the dataset generator 134 may splice the datasets into portions based on the generated query and/or assignments. For example, if the query is broken down into 10 assignments and 7 assignments involve the use of the same 12 files, then the dataset generator 134 may designate a dataset portion to be the 12 files used by 7 assignments. Using this dataset portion of 12 files loaded into local memory, each assignment will be executed on the same process (associated with the local memory) of a node. In some aspects, the dataset generator 134 may record the memory address locations for each portion of the dataset in order to facilitate loading of the dataset portion into the memories 108 and 114.

Figure 2:
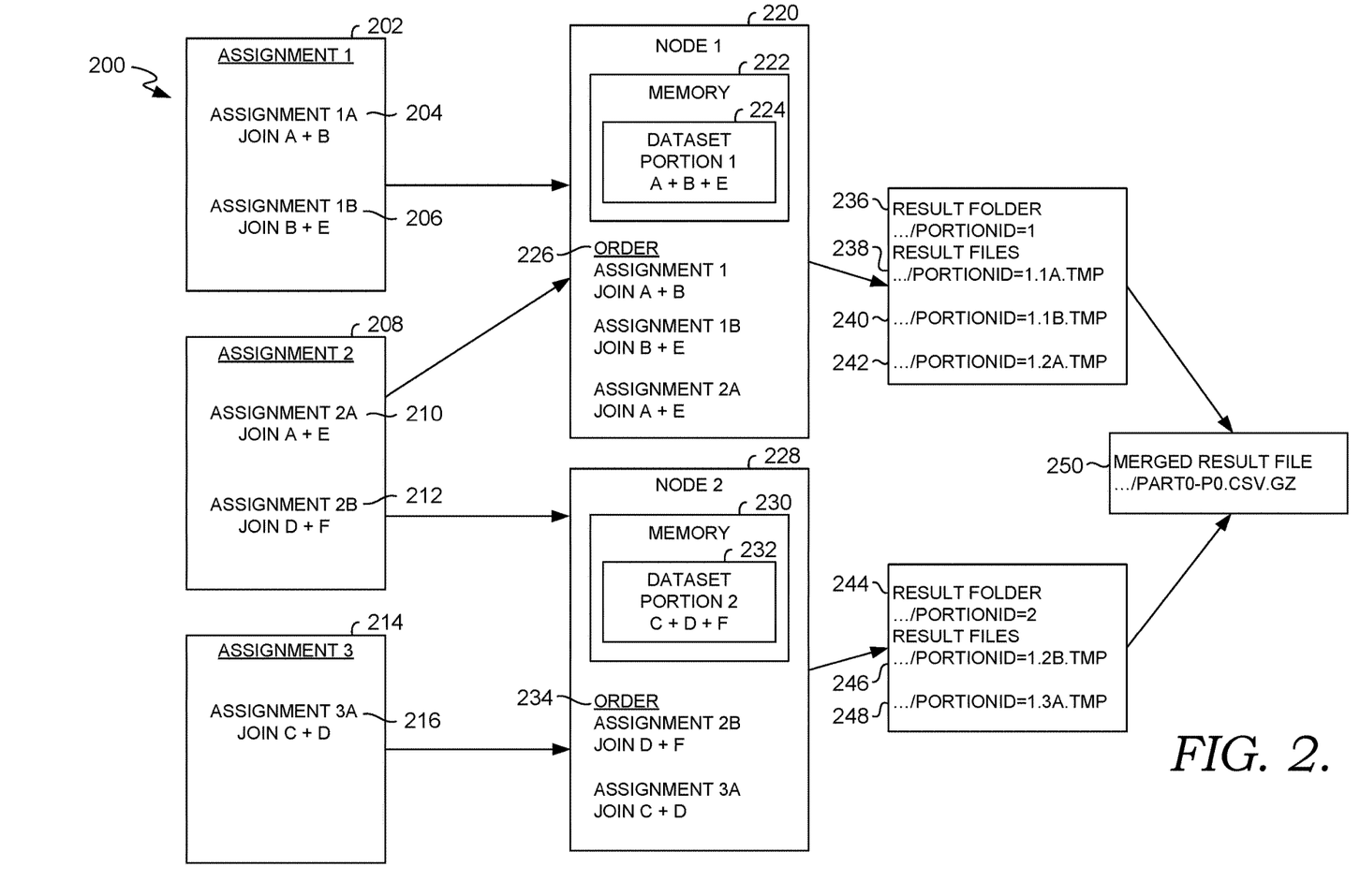
FIG. 2 is an example assignment schedule involving three assignments, in accordance with aspects described herein.

Turning briefly to FIG. 2, example assignment schedule 200 is provided. For the purposes of this example, a generated dataset includes subsets of data, as denoted by "A," "B," "D," "F," "T," and "S," which are necessary for performing an API call (and its associated query) provided by the user. Assignments 202, 208, and 214 illustrate that each assignment performs a "join" operation and uses a combination of subsets of the dataset to perform the operation. As shown in assignment 202, the data subsets A, B, and E are necessary to execute sub-assignment 204 and sub-assignment 206. Assignment 208 also has sub-assignment 210 that uses data subsets A and E. Likewise, sub-assignment 212 uses data subsets D and F. Assignment 214 includes sub-assignment 216 that uses data subsets C and D. Based on the datasets the sub-assignments use, the dataset generator 134 may generate dataset portions that may be operated on by multiple assignments. For example, dataset generator 134 generated dataset portion 224 to include data subsets A, B, and E because sub-assignment 204, sub-assignment 206, and sub-assignment 210 all use data subsets A, B, and E. Likewise, dataset generator 134 designated dataset portion 232 to include data subsets C, D, and F, which are used by sub-assignment 212 and sub-assignment 216. The dataset portions 224 and 232 may be assigned to nodes 220 and 228 on the basis of the memory sizes of memories 222 and 230 of each respective node.

With reference again to FIG. 1, assignment generator 136 generally determines assignments, including the assignments necessary to implement a query, which nodes will be performing which assignments, how to implement assignments based on implementation instructions, and how many processes are necessary. The assignment generator 136 may formulate a part or all of a query plan, which determines the location of necessary data and the order in which assignments will be executed, among other things. While formulating the query plan, the assignment generator 136 may determine assignments based on the query and the sub-tasks that need to be completed to implement the query. For example, if the query involves compiling a variety of data from various databases, then the assignment generator 136 may determine a set of assignments with "join" instructions to collect and concatenate the requested information from various data stores. In some aspects, the formulation of the query plan involves the use of additional API calls.

As a part of determining the query plan, the assignment generator 136 may also optimize and group assignments based on the dataset portions that they use. For instance, if several assignments use the same dataset portion, then the assignment generator 136 may group these assignments to be performed by the same process with corresponding memory (loaded with the dataset portion) on a particular node. Likewise, the assignment generator 136 may also determine the ordering to perform assignments grouped together to ensure that the operations being performed by the process are executed efficiently. The assignment generator 136 may also provide each assignment and sub-assignment with a unique identifier, which is used to associate the result from any executed operations with the assignment. The unique identifiers may also be used to combine results from a larger assignment that was split into smaller sub-assignments and executed by multiple processes across several nodes. For example, if a part of one assignment was performed by a process on one node and another part of the same assignment was performed by a process on another node, each part of the assignment would have a unique identifier to trace the results back to each sub-assignment and the larger assignment.

Turning briefly to FIG. 2, FIG. 2 illustrates that a query has been segmented into three different assignments: sub-assignment 202, sub-assignment 208, and sub-assignment 214. Assignment 202 has two sub-assignments, sub-assignment 204 and sub-assignment 206. Each sub-assignment has a unique identifier. For instance, the unique identifier for sub-assignment 204 is "1A." Likewise, the unique identifier for assignment 1B 206 would be "1B." The same is true for the other sub-assignments 210, 212, and 216. In this example, as explained above, the dataset used to generate the query includes at least data subsets of "A," "B," "C," "D," "E," and "F." These dataset portions were determined to be necessary to execute assignment 202, assignment 208, and assignment 214. As shown by the two nodes in FIG. 2, node 220 and node 228 store different portions of the larger dataset (e.g., "A," "B," "C," "D," "E," and "F") in memory 222 and memory 230, respectively. For instance, memory 222 of node 1 220 stores dataset portion 224, which includes data subsets "A," "B," and "E." Likewise, memory 230 of node 228 stores dataset portion 2 232, which includes data subsets "C," "D," and "F." Although not pictured in FIG. 2, memory 222 and memory 230 are each associated with a respective process that executes each group of assignments using the corresponding dataset portions 224 and 232.

Continuing with FIG. 2, based on the dataset portions the assignments each use, the assignment generator 136 groups the assignments together accordingly. For example, sub-assignment 204, sub-assignment 206, and sub-assignment 210 are grouped together to be performed on node 220 because each of the assignments includes an operation, such as a join operation, that uses dataset portion 224. Likewise, sub-assignment 212 and sub-assignment 216 are grouped together to be performed on node 228 because each assignment involves a "join" operation using dataset portion 232.

As shown with respect to each node, the assignment generator 136 provides the order in which each assignment should be performed on the dataset portion to optimize efficiency. For example, order 226 shows the order in which the three assignments slotted for node 220 are to be performed (by a process not shown) based on the assignments provided by assignment generator 136 of FIG. 1. Likewise, order 234 illustrates the order set out for executing sub-assignments 212 and 216 on node 228.

Not shown on each node in FIG. 2, as mentioned previously, however, is a process executing on its corresponding memory. For instance, node 220 includes a process (not shown) and a corresponding memory 222, which can be accessed by the process without an input/output call, that stores dataset portion 224. Likewise, node 228 includes a process (not shown) and a corresponding memory 230, which can be accessed by the process without an input/output call, that stores dataset portion 232. In this example, the sub-assignments 204, 206, 210, 212, and 216, as generated by the assignment generator 136 of FIG. 1, are sent by controller 122 of FIG. 1 for execution to the nodes in the system, such as node 104 and node 110 of FIG. 1 or node 220 and node 228 of FIG. 2.

Continuing with FIG. 2, as mentioned briefly above, the execution of assignments and sub-assignments across multiple nodes 220 and 228 allows for parallel execution of the assignments, such that sub-assignments corresponding to a larger assignment may be executed substantially concurrently. For instance, sub-assignment 210 and sub-assignment 212, which are part of a larger assignment 208, are performed substantially concurrently on separate noes 220 and 228 without the need for separate input/output calls for each assignment.

Turning back to FIG. 1, the assignment generator 136 may also determine which nodes will perform the assignment based on features of the task to perform. For example, if the assignment requires a dataset that is very large, then the assignment generator 136 may task a process on a node with a large associated memory to perform the assignment. The assignment generator 136 may additionally determine the number of processes that are necessary to perform the assignments associated with a query. In some aspects, the user may specify the number of processes and/or nodes to be used. The assignment generator 136 may also add additional processes to execute the assignments associated with a query to account for a process that fails to complete an assignment or a process that becomes unresponsive.

The assignment generator 136 may also generate instructions regarding implementation of an assignment. The implementation instructions may be provided by a user within the API call. For instance, the user may specify that the assignments should be implemented using the local memory associated with a process. In that case, for instance, the assignment generator 136 may provide additional in-memory database implementation instructions that accompany assignments sent to their designated nodes and processes.

The assignment generator 136 may operate with the assignment processing engine 138 to provide assignments and accompanying implementation instructions to processes 106 and 112 to nodes 104 and 110.

Assignment processing engine 138 is illustrated as including assignment receiver 140, dataset loader 142, assignment processor 144, and result merger 146. Assignment processing engine 138 may operate with nodes 104 and 110 to send assignments, execute assignments, and receive results from executed assignments. Assignment processing engine 138 may also operate with controller 122 to communicate the assignments to and receive results from nodes 104 and 110.

Assignment receiver 140 generally receives assignments that have been generated by scheduling engine 130 based on a query associated with a user's API call. Assignment receiver 140 may also receive additional instructions regarding the implementation of the assignments. For example, a batch of assignments associated with a query may be received with an additional instruction to implement the query by utilizing memories 108 and 114 associated with processes 106 and 108 of nodes 104 and 110. In some aspects, the instructions may contain implementation details such as overriding the use of disk memory, which is available to API call processing system operating environment 100, in favor of using the memories 108 and 114 associated with processes 106 and 112, respectively. These instructions will be implemented when the assignments are executed by the processes 106 and 112 of nodes 104 and 110, respectively.

Dataset loader 142 generally obtains portions of datasets, as determined by the scheduling engine 130, and loads them into the memory of a designated node for a process to perform operations on. The dataset portions may be loaded onto the memories 108 and 114 of nodes 104 and 110 in a variety of ways. In some aspects, the dataset loader 142 may directly load dataset portion for a particular node that are small enough to fit onto the memory associated with a process. For instance, if memory 108 of node 104 is 64 MB and the dataset portion designated for the node is only 5 MB, then the dataset loader 142 may load the dataset portion onto memory 108 in its entirety. The dataset loader 142 may also load the dataset portion in a lazy iterator manner if the dataset portion is larger than the memory of the designated node. For instance, if memory 108 of node 104 is 64 MB and the dataset portion is 128 MB, then the dataset loader 142 may load 64 MB of the dataset portion at a time into memory 108 and perform assignments using the loaded portion in memory 108. As the remaining part of the dataset portion is necessary, the dataset loader 142 may load that data into memory 108.

In brief reference to FIG. 2, node 220 includes a process (not shown) that uses memory 222, which has dataset portion 224 stored on it. Likewise, node 228 includes a process (not shown) that uses memory 230, which has dataset 232 stored on it. As mentioned above, if dataset 232 were larger than memory 230, then a node may use lazy iteration for evaluating the dataset portion.

Turning back to FIG. 1, the dataset loader 142 may operate with database 118 to obtain datasets (or portions thereof) necessary to implement a query. Likewise, dataset loader 142 may operate with memories 108 and 114 of nodes 104 and 110, respectively, to provide datasets for each of processes 106 and 112 to implement the assignments.

Assignment processor 144 generally implements assignments using the processes and memory on designated nodes. Using the generated assignments and sub-assignments, assignment processor 144 may facilitate the performance of each assignment at their designated nodes to receive results. In some aspects, the assignment processor 144 implements the assignments on nodes 104 and 110 using instructions regarding implementation. For instance, if there is an instruction to override the use of disk to perform operations on a dataset and instead use the memory 108 associated with process 106, the assignment processor 144 may engage processes 106 and 112 on designated nodes 104 and 110 to use dataset portions loaded onto memories 108 and 114 to execute assignments. The assignment processor 144 may also facilitate the use of lazy iteration to execute an assignment on a dataset that is larger than the memory 108 associated with process 106, as described above.

The assignment processor 144 may operate with nodes 104 and 110 and processes 106 and 112 to process assignments on a dataset. The assignment processor 144 may also operate with controller 122 to transmit and store merged results from nodes 104 and 110.

Result merger 146 generally obtains results from assignments and merges them into a file with the complete set of results. Once a process, such as process 106 or process 112, has completed an assignment, the result merger 146 provides the result in a file with a unique naming convention based on the dataset portion used by the process to execute the assignment. The unique naming convention of the file storing results may include a unique identifier of the assignment associated with the as well. The unique naming convention may apply to both folders and files storing the results from executed assignments.

The results may also be stored in different types of files based on whether the process 106 or 112 has completed the assignment. For instance, as an assignment is being executed on process 106 using a dataset portion stored on memory 108, the results that have been calculated so far may be stored in a temporary file with a filename that includes both the dataset portion and unique identifier of the assignment being executed. Once the assignment is completed, the temporary file may be transformed into a file that does not have the ".tmp" extension. The result files for the assignments may also be stored in a folder that is named according to the dataset portion being used to execute assignments. In some aspects, once the assignment has completed, the result file will be transmitted to a distributed file system, such as a Hadoop Distributed File System. In some aspects, the result merger 146 in operation with controller 122 may manage the storage of the temporary result files and storage of the completed result files.

Turning to FIG. 2, result folder 236 and result folder 244 include results from the processing of sub-assignments 204, 206, and 210. For example, result file 238 is a temporary file that includes partial tabulated results from sub-assignment 204 as it is being processed. The filename of result file 238, which includes "/portionId=1.1A," includes both an identifier of the dataset portion 224 (i.e., "portionID=1") being operated on and the sub-assignment's unique identifier ("1A"). The same is true of sub-assignment 204 and sub-assignment 206, which have corresponding temporary result files 240 and 242. The result files 238, 240, and 242 are stored in a result folder 236 with a folder name that includes an identifier of the dataset portion that was operated on (i.e., "portionID=1"). Similarly, result files 246 and 248 are temporary files with file names corresponding to dataset portion 232 and their respective assignment unique identifiers. These result files are similarly stored in a folder with a folder name indicating dataset portion 232 (i.e., "portionID=2"). When each of these assignments is completed, the temporary files are transformed into completed files without the ".tmp" extension that include all of the results for a completed assignment.

Turning back to FIG. 1, result merger 146 may also merge files containing completed results from assignments to generate a single result file for a query associated with an API call. For instance, if an assignment was split into several sub-assignments that were processed across multiple nodes, each sub-assignment may have its own result file. Using those files, the result merger 146 may merge the results from each sub-assignment to create a file with the results for the assignment as a whole. The result merger 146 may also convert the merged result file into a format that is used by other components in API call processing system operating environment 100. For instance, the merged result file may be stored as a zipped comma-separated values file. In some aspects, result merger 146 in operation with controller 122 may delete any remaining incomplete temporary files after all of the assignments have been executed.

Briefly turning to FIG. 2, merged result file 250 includes merged results from sub-assignments 204, 206, 210, 212, and 216. In this example, the sub-assignments are first merged according to the assignments they are associated with. For instance, result files 238 and 240 are merged in order to obtain results for assignment 202. Likewise, result files 242 and 246 are merged to obtain results for assignment 208. These merged result files are then merged with result file 248 to obtain results for the query that was broken down into assignments 202, 208, and 214. As shown in FIG. 2, the merged result file 250 is formatted to be a comma-separated value zip file.

Turning back to FIG. 1, result merger 146 may transmit the merged result file to the API call engine 124. The result merger 146 may also transmit a confirmation that the query was processed successfully.

The result merger 146 may operate with nodes 104 and 110 and processes 106 and 112 to process assignments, receive results, and merge result files. The result merger 146 may also operate with API call engine 124 to provide results via client-computing device 102 to the user requesting an API call. Additionally, the result merger 146 may operate with controller 122 to transmit and store merged results from nodes 104 and 110.

It will be understood that the components of the API call engine 124, scheduling engine 130, and assignment processing engine 138 may be discrete algorithms or models. However, as noted, components of API call engine 124, scheduling engine 130, and assignment processing engine 138 are described as discrete components to aid in describing the technology. Although in other embodiments intended by this disclosure, the functions of these components may overlap or be further divided. Thus, it will also be understood that other embodiments of the technology include a combined implementation of these components. For instance, the dataset generator 134 may be a modification to the assignment generator 136 (a modified assignment generator) that incorporates apportioning datasets into determining assignments. In such cases, the modified assignment generator can determine and apportion datasets based on the generated assignments. While the disclosure describes these (and other) components separately, it is intended that this also includes modified or combined implementations of these components. That is, for example, where functions are separately described as "generating a dataset" and "generating an assignment," it is intended that these separately disclosed steps also include a single action of generating an assignment and apportioning datasets corresponding to those assignments by a modified assignment generator.

Methods may be performed using the concurrent browsing system described herein. In embodiments, one or more computer storage media having computer-executable instructions embodied thereon that, when executed, by one or more processors, cause the one or more processors to perform the methods in the search system.

Figure 3:
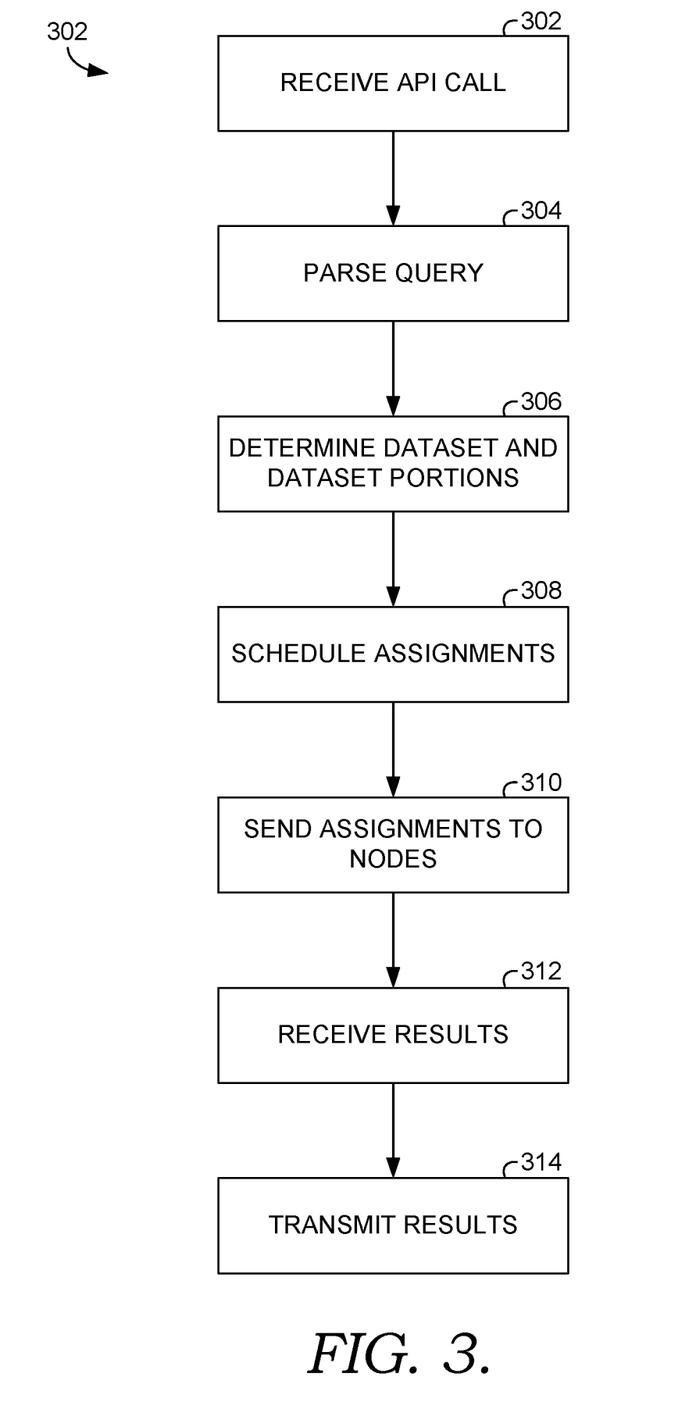
FIG. 3 is a block diagram illustrating an example method for scheduling assignments from an API call, in accordance with aspects described herein.

One example for receiving API calls, generating dataset portions and assignments, and receiving results is illustrated by method 300 of FIG. 3. At block 302, an API call is received through the API call engine and is parsed and routed to the scheduling engine. The API call is received from a client-computing device. The client-computing device may be remote from the API call or scheduling engines, or may host all of or a portion of the engines. In either aspect, the API call engine receives the request from the client-computing device. In some aspects, the request may include instructions regarding implementation of the API call. For instance, the in-memory database implementation instructions may require that nodes performing assignments associated with a query parsed from the API call override the default use of an on-disk database implementation (e.g., using disk memory) and instead use memory local to a process executing on a node. API call engine 124 of FIG. 1 is an example API call engine that can be used by the method. At block 304, the query is parsed. The query may be further parsed into assignments and sub-assignments by a query receiver. Query receiver 132 of FIG. 1 is an example query receiver that can be used by the method. At block 306, a dataset and corresponding dataset portions are determined. The dataset corresponding to a query may be determined. Dataset portions may be determined based on the size of memory associated with processes as well as the number of assignments that may use the same dataset portion. The dataset and dataset portions can be generated using a dataset generator. Dataset generator 134 of FIG. 1 is an example dataset generator that can be used by the method.

At block 308, assignments are scheduled. The assignments may be scheduled to optimize performance of the assignments that use the same dataset portions. The number of processes needed to execute the assignment(s) may also be determined. Each assignment (and sub-assignment) may have a corresponding unique identifier. The assignment may also be accompanied by in-memory database implementation instructions based on an API call from the user. Assignment generator 136 of FIG. 1 is an example assignment generator that can be used by the method. At block 310, the assignments are sent to the nodes. In some aspects, all assignments are sent to all nodes. Similarly, in some aspects, only those assignments to be performed by a particular node may be sent to corresponding nodes. Assignment generator 136 of FIG. 1 is an example assignment generator that can be used by the method. The assignment generator can route assignment(s) to nodes accordingly. The assignment generator may also include implementation instructions as designated in an API call.

At block 312, results are received. The results from each process executing an assignment (or sub-assignment) may be received. The results of each assignment or sub-assignment may be merged to provide a merged result file that includes data responsive to an API call. The results may be received and merged using a result merger. Result merger 146 of FIG. 1 is an example result merger that can be used by the method.

At block 314, the results are transmitted. The merged results, which may be stored in the form of a result file, are transmitted. In some aspects, the results are displayed to a user using a client-computing device via a user interface. A notification of whether an API call was successfully or unsuccessfully completed may also be transmitted to the user. Result merger 146 and API result receiver 128 of FIG. 1 are example result receivers and transmitters suitable for use by the method. The result merger 146 may transmit merged results to API result receiver 128 for presentation to the user through a user interface via a client-computing device.

Figure 4:
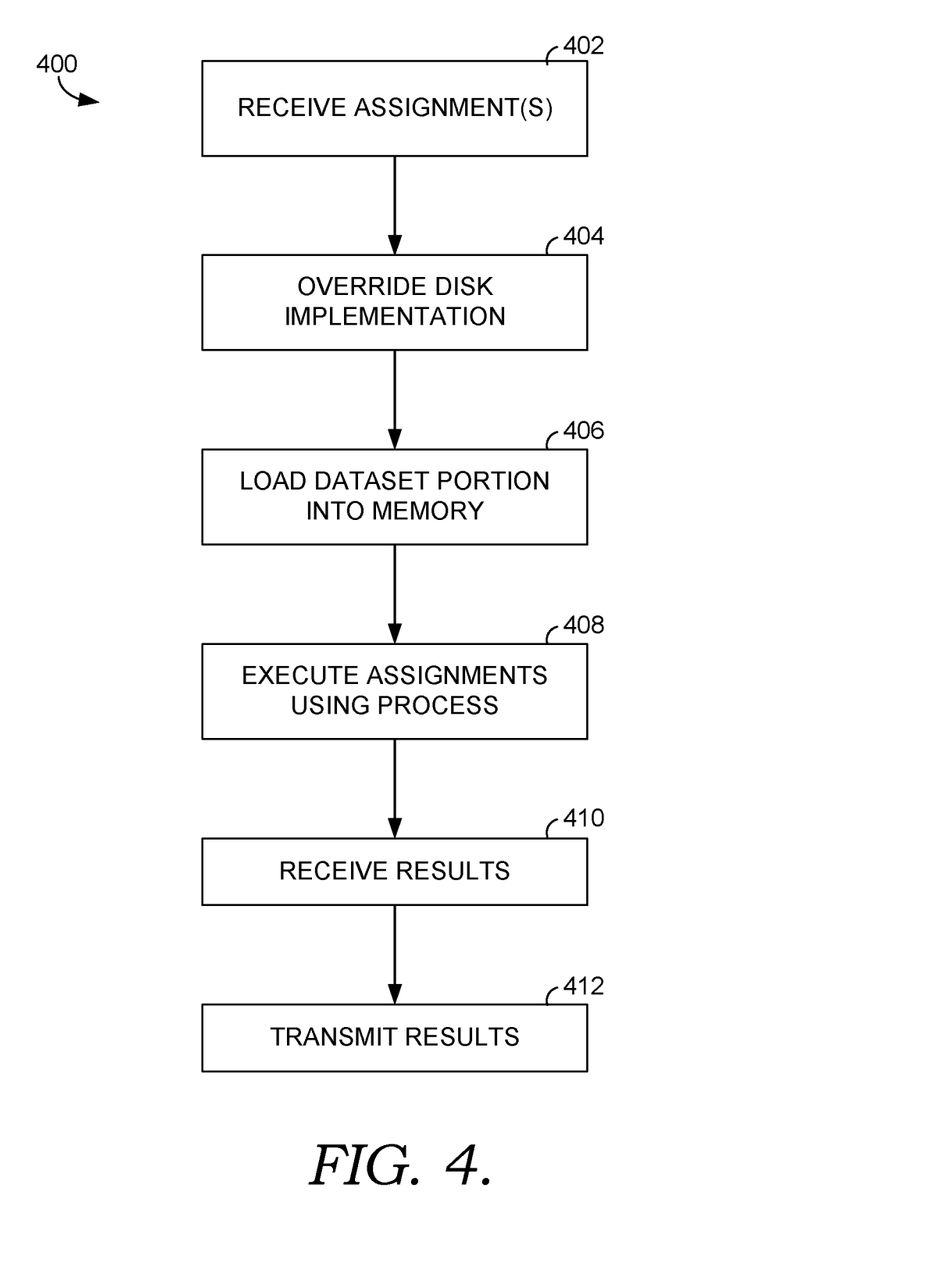
FIG. 4 is a block diagram illustrating an example method for executing assignments using dataset portions, in accordance with aspects described herein.

One example for implementing assignments on nodes using processes and accompanying memory is illustrated by method 400 of FIG. 4. At block 402, assignments are received. The assignment may include sub-assignments along with implementation instructions for the assignments. Assignment receiver 140 of FIG. 1 is an example assignment receiver suitable for use by the method. At block 404, an instruction to override disk implementation is executed. The instruction may require that the assignment be performed on a node with a process executing using a corresponding memory that is local to the processor. In some aspects, the overriding disk implementation inhibits the default use of an on-disk database implementation and instead uses memory associated with a process and available to the node. An assignment receiver may enforce implementation of such an instruction. Assignment receiver 140 of FIG. 1 is an example assignment receiver suitable for use by the method. At block 406, dataset portions are loaded into memory. Based on the assignment to be performed by a given node and process, the corresponding dataset portion may be loaded onto the memory associated with the process (instead using disk memory). Dataset loader 142 of FIG. 1 is an example dataset loader suitable for use by the method. In some aspects, the dataset portion may be used by the process in a lazy iteration manner if the dataset portion exceeds the size of the memory associated with the process.

At block 410, results from each assignment or sub-assignment are received. The results may be stored in a temporary file as the results are being calculated. The temporary and final result file for each assignment or sub-assignment being executed on a node may have a file name that includes an identifier of the dataset portion being operated on and a unique identifier corresponding to the particular assignment. The result files, both temporary and complete, may be stored in a folder structure that is named based on the dataset portion used to calculate the assignments related to the result files. Result merger 146 of FIG. 1 is an example result merger that can be used by the method. At block 412, results are transmitted. The result files from each node may be transmitted for merging. Result merger 146 of FIG. 1 is an example result merger and receiver suitable for use by the method. Result merger 146 may receive results from each node and operate with controller 122 for additional result merging and transmission.

Having described an overview of embodiments of the present technology, an example operating environment in which embodiments of the present technology may be implemented is described below in order to provide a general context for various aspects. Referring initially to FIG. 5, in particular, an example operating environment for implementing embodiments of the present technology is shown and designated generally as computing device 500. Computing device 500 is but one example of a suitable computing environment and is not intended to suggest any limitation as to the scope of use or functionality of the technology. Neither should computing device 500 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrates an example computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile or nonvolatile memory. The memory may be removable, non-removable, or a combination thereof. Example hardware devices include solid-state memory, hard drives, optical-disc drives, etc. Computing device 500 includes one or more processors that read data from various entities such as memory 512 or I/O components 520. Presentation component(s) 516 present data indications to a user or other device. Examples of presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. User input, such as API calls, received from I/O port(s) 518, in conjunction with I/O components 520, may be used by API Parser 524 to aid in parsing and processing API calls.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of" another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The distributed computing environment depicted herein is merely an example. Components can be configured for performing novel aspects of the technology, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations.

This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A computer-implemented method comprising:
receiving a query at an application programming interface from a caller;
parsing the query into a first assignment and a second assignment, wherein the first assignment operates on a first portion of a dataset and a second portion of the dataset, and wherein the second assignment operates on the second portion of the dataset but does not operate on the first portion of the dataset;
grouping the first assignment and the second assignment into a first group based on both the first assignment and the second assignment operating on the second portion of the dataset;
based on the first group operating on the first portion and the second portion of the dataset, sending the first portion and the second portion of the dataset to a first node such that the first portion and the second portion of the dataset are each loaded into a first memory of the first node; and
sending the first group to the first node for executing the first assignment using the first portion and the second portion of the dataset stored in the first memory and executing the second assignment using the second portion of the dataset stored in the first memory.

2. The method of claim 1, the method further comprising:
writing a first result from the executing the first assignment to a first file;
writing a second result from the executing the second assignment to a second file;
merging the first file and the second file to a result file; and
returning data from the result file to the caller.

3. The method of claim 1, wherein the query received at the application programming interface from the caller comprises an instruction to override a default use of an on-disk database implementation.

4. The method of claim 2, wherein the first file is uniquely named based on the first assignment and the second file is uniquely named based on the second assignment.

5. One or more computer storage media having computer-executable instructions embodied thereon that, when executed by one or more processors, cause the one or more processors to perform a method, the method comprising:
receiving a first query and a second query at an application programming interface from a caller;
parsing the first query into a first assignment and a second assignment;
parsing the second query into a third assignment and a fourth assignment;
grouping the first and third assignments into a first group based on the first and third assignments each requiring a first portion of a dataset;
grouping the second and fourth assignments into a second group based on the second and fourth assignments each requiring a second portion of the dataset;
sending the first portion of the dataset to a first node such that the first portion of the dataset is loaded into a first memory of the first node;
sending the second portion of the dataset to a second node such that the second portion of the dataset is loaded into a second memory of the second node;
sending the first group to the first node and the second group to the second node
executing the first and third assignments using the first portion of the dataset stored in the first memory; and
executing the second and fourth assignments using the second portion of the dataset stored in the second memory.

6. The media of claim 5, wherein the method further comprises:
writing a first result from the executing the first and third assignments to a first file;
writing a second result from the executing the second and fourth assignments to a second file;
merging the first file and the second file to a result file; and
returning data from the result file to the caller.

7. The media of claim 5, wherein the query received at the application programming interface from the caller comprises an instruction to override a default use of an on-disk database implementation.

8. The media of claim 6, wherein the first file is uniquely named based on the first and third assignments and the second file is uniquely named based on the second and fourth assignments.

9. The media of claim 5, wherein the first assignment and the second assignment are executed in parallel.

10. An application programming interface system, the system comprising:
one or more processors; and
one or more computer storage media storing computer-useable instructions that, when used by the one or more processors, cause the one or more processors to perform operations, the operations comprising:
receiving a query at an application programming interface from a caller;
parsing the query into a plurality of assignments;
generating a query plan comprising grouping assignments of the plurality of assignments into a first group,
wherein the grouping the assignments into the first group is based on each of the assignments of the first group requiring a first portion of a dataset, and
wherein an assignment of the first group further requires a second portion of the dataset not required by at least one other assignment of the first group; and
executing the query plan by causing the first group, the first portion of the dataset, and the second portion of the dataset to be sent to a node for execution of each of the assignments of the first group.

11. The system of claim 10, wherein the operations further comprise:
sending a third portion of the dataset to a second node such that the third portion of the dataset is loaded into a second memory of the second node; and
sending a second assignment of a second group to the second node based on the second assignment requiring at least part of a third portion of the dataset.

12. The system of claim 11, wherein the assignment of the first group and the second assignment of the second group are executed in parallel.

13. The system of claim 10, wherein the query received at the application programming interface from the caller comprises an instruction to override a default use of an on-disk database implementation.

* * * * *